April 13, 1948.  J. C. BANCROFT  2,439,556
SCOOTER
Filed July 17, 1946  2 Sheets-Sheet 1
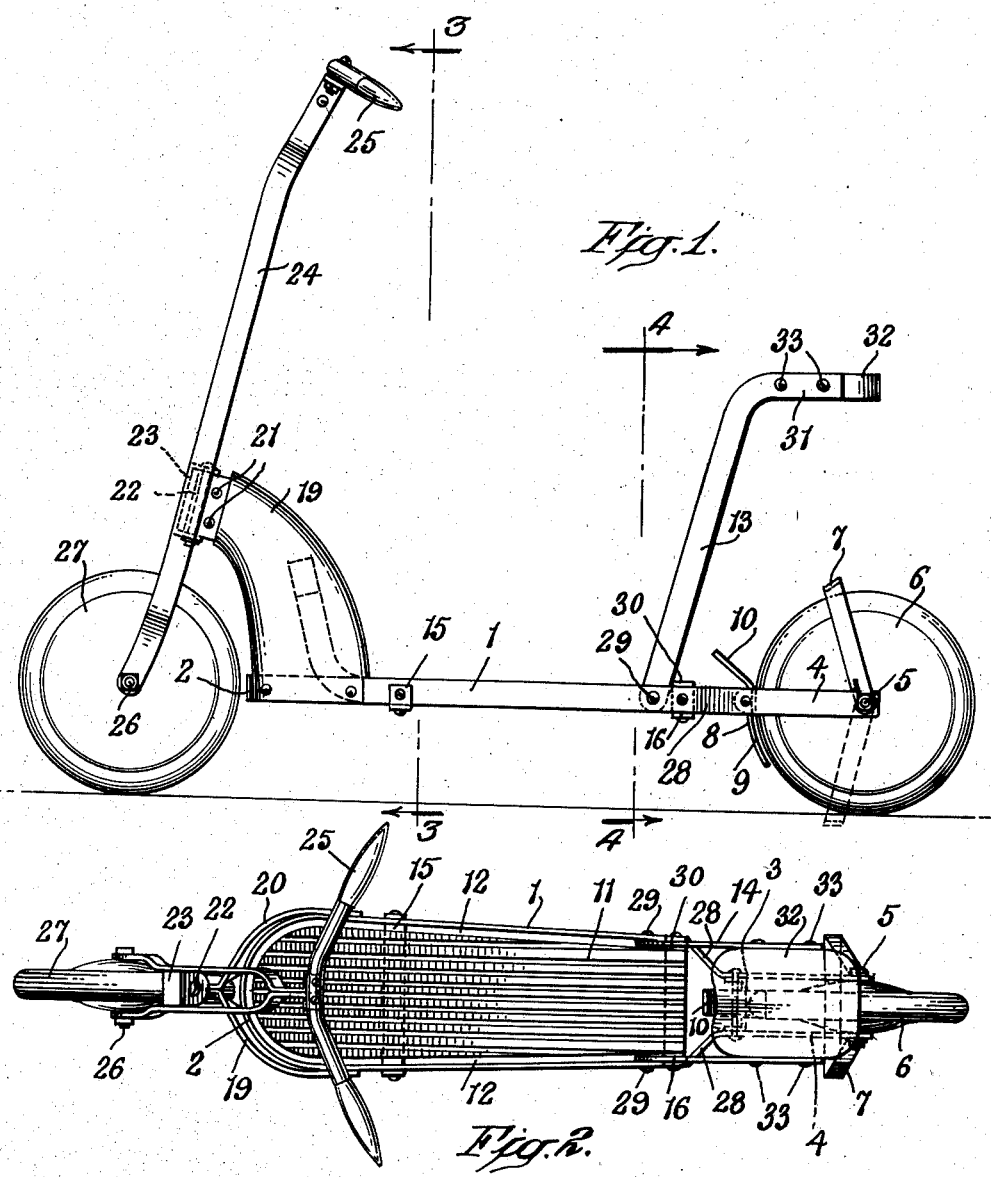
INVENTOR.
Joseph C. Bancroft
BY
Harry Radzinsky
ATTORNEY April 13, 1948.  J. C. BANCROFT  2,439,556
SCOOTER
Filed July 17, 1946  2 Sheets-Sheet 2

INVENTOR.
Joseph C. Bancroft
BY
Harry Redzinsky
ATTORNEY

Patented Apr. 13, 1948

2,439,556

UNITED STATES PATENT OFFICE 2,439,556

SCOOTER

Joseph C. Bancroft, New York, N. Y.

Application July 17, 1946, Serial No. 684,216

3 Claims. (Cl. 280—87.04)

1

This invention relates to scooters and similar wheeled toys, and the primary object of the invention is to provide an article of this character of sturdy construction, pleasing design and one which is capable of use in several ways.

One object of the invention is to provide a scooter having means by which the rider may use the device while in either a standing or sitting position, the invention contemplating the provision of a platform on which the rider may stand, as well as a foldable seat for use when the rider desires to use the vehicle for coasting while in a seated position.

Another object of the invention is to provide, in a vehicle of this character, means for pivotally mounting a foldable seat structure, whereby the seat, when in an inoperative position, may be folded down to occupy a position wherein it will not interfere with the normal use of the vehicle as a scooter.

The invention further contemplates the provision of a novel frame structure; of platform-mounting means thereon; of the provision of seat-storing space, and of other features to be more specifically set forth hereinafter and pointed out in the claims appended hereto.

Figure 3:
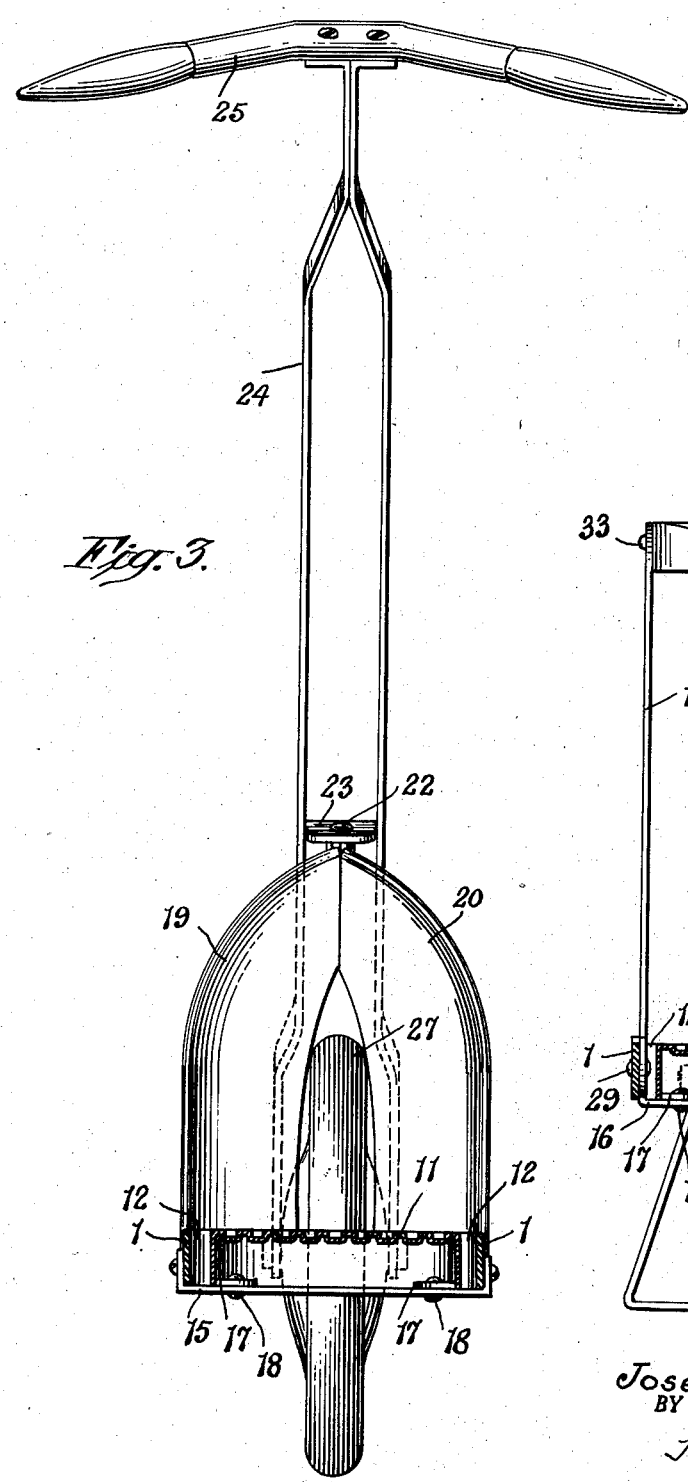
Figure 4:
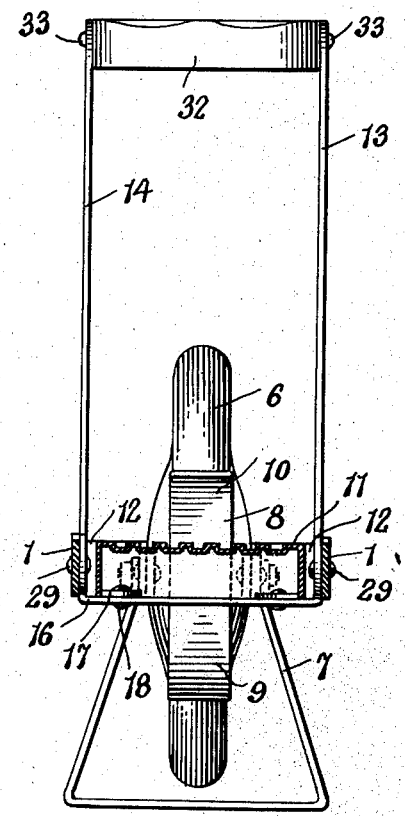

In the accompanying drawings, wherein an illustrative embodiment of the invention is disclosed, Fig. 1 is a side elevation of a scooter or similar wheeled vehicle, constructed in accordance with the invention; Fig. 2 is to a top plan view of the same; Fig. 3 is a sectional view on the line 3—3 of Fig. 1, looking in the direction of the arrows, and Fig. 4 is a sectional view on the line 4—4 of Fig. 1, looking in the direction of the arrows.

With reference to the drawings, 1 indicates the frame of the scooter, the same being preferably, but not necessarily, of a single lengthy piece of strip metal and being bent or shaped into substantially U-form, having thus a looped or rounded forward end 2, and a forked rear end, the latter end being composed of the two arms 3 and 4 between which the axle 5 is carried. The rear wheel 6 is rotatively mounted on the axle 5 and it thus rotates between the arm portions 3 and 4 of the frame. A pivoted supporting stand 7 may be provided, the same being shown in its "up" or raised position in Fig. 4, the supporting position of the stand being indicated in dotted lines therein.

Pivotally mounted between the arms 3 and 4 of the frame, is a lever 8, constituting a brake, the same having a lower arcuate shoe portion 9 applicable against the periphery of the rear wheel

2

6, and having a pedal portion 10 extending forwardly in position to enable it to be depressed when required by the heel of the rider to apply the arcuate or shoe portion 9 against the wheel 6.

At 11 is shown the foot-board or platform of the scooter, the same being preferably, but not necessarily, of pressed metal, and being longitudinally corrugated for rigidity and strength and to provide a non-slipping surface. This platform or footboard, upon which the rider of the vehicle stands, is shaped to fit within the frame 1 but it is spaced slightly from the inner surfaces thereof, as indicated at 12, this spacing serving to provide a channel constituting storage space for the supporting uprights or arms 13, 14 of the seat 32, when the seat is in its lowered position.

The frame 1 is stiffened and strengthened by means of several spaced transverse bars or braces 15, 16 to which the platform or footboard 11 may be secured by means of the lugs 17 and rivets 18 or other equivalent fastening means. Secured to the looped or curved forward portion of the frame 1 and arising therefrom is a pair of guards or shields 19, 20, preferably of sheet metal, the upper ends of the same being secured together by rivets 21 or other suitable means, and carrying a pivot pin 22 in which a bracket 23 is pivotally mounted. The bracket 23 is secured to, and thus forms a part of, the fork 24 which is provided at the top with the handle bars 25 and at its lower forked end with the front axle 26 upon which the front wheel 27 is rotatively mounted. This mounting permits pivotal movement of the fork 24 and thus allows the wheel 27 to be steered.

Located toward the rear portion of the frame 1 and just forwardly of an inwardly bent portion 28 thereof, is the pivoted seat, which includes the side arms or uprights 13 and 14 and the seat portion 32. These arms are pivoted at their lower ends, as indicated at 29, to the side bars of the frame 1, and when the arms or uprights 13 and 14 are in their raised position, as shown in Fig. 1 they rest against the vertical end portions 30 of the cross-bar 16, which portions serve as abutments, thereby limiting the rearward movement of the arms 13 and 14 and holding the seat in its upright or supporting position.

At the top, the arms or uprights 13 and 14 are off-set as indicated at 31 and the seat 32 is secured between these off-set ends by means of the bolts, screws or other fastening elements 33. The arrangement is such that when the arms 13, 14 are in their upstanding position, as shown in Fig. 1, the seat 32 is horizontally disposed so that the rider may occupy the same while holding the handle bars 25, and may thus use the vehicle as a coaster.

When it is desired to use the vehicle as a scooter, at which time the rider will stand upon the foot-board or platform 11 with one or both feet, it is desirable for the foot-board or platform 11 to be free of all obstructions, and with this in view, the seat is moved out of the way by being swung forwardly and downwardly to occupy the position shown in dotted lines in Fig. 1. When the seat is swung downwardly as above described, the arms or uprights 13 and 14 will fit into the space 12 located between the edge of the foot-board or platform 11 and be disposed either flush with or below the upper surface of the foot-board or platform 11, and the seat portion 32 will be located up forward and positioned behind the guards 19 and 20. Thus, when the seat is so disposed, it is located completely out of the way, leaving the greater portion of the foot-board or platform 11, free of obstructions so that it can be readily used for standing purposes. When it is desired to use the vehicle as a coaster, it is merely necessary to swing the seat frame upwardly to the limit of its rising movement, as determined by the abutment of the arms or uprights 13 and 14 against the elements 30 and the seat is then ready for use.

While I have described one embodiment of the invention, it is obvious that the same is not to be restricted thereto, but is broad enough to cover all structures coming within the scope of the annexed claims.

What I claim is:

1. In a toy vehicle, a frame in the form of an elongated loop, the ends of the looped frame being disposed at the rear of the vehicle and forming a wheel-receiving fork, cross members connecting the sides of the loop, a platform supported within the loop and having its side edges spaced from the sides of the loop, a seat having supports pivoted at one end to the frame between the platform and the frame, whereby said supports will lie in the space between the platform and the frame when the seat is in a folded-down position.

2. In a toy vehicle of the scooter type, a loop-shaped frame, a wheel supported within the rear of the frame, a platform supported within and having its edge spaced from the frame, the forward end of the frame forming a continuous curve, a sheet metal shield extending around said curved part of the frame and arising therefrom, a front fork pivotally supported at the forward end of the shield, a seat pivotally supported by the frame, stops on the frame for limiting the upward pivotal movement of the seat, supports on which the seat is carried, said supports when lowered, fitting between the frame and the platform, and the seat when in said lowered position, being located at the forward end of the platform behind the shield.

3. In a toy vehicle, a frame of substantially U-shape, the ends of said frame constituting a fork in which a rear wheel is rotatively mounted, the frame having a forward curved portion, a pair of sheet-metal shields secured to said forward curved portion and extending upwardly and forwardly thereof, the forward ends of said shields carrying a pivot pin, a fork pivotally mounted on said pin, a wheel rotatively mounted in the fork, steering means mounted on the fork, a foldable seat carried by the frame, said seat including a pair of arms pivoted adjacent to the rear of the frame and forwardly of the rear wheel, and a platform secured within and having sides spaced from the frame whereby the arms of the seat will fit between the platform and frame when the seat is in its lowered position.

JOSEPH C. BANCROFT.

REFERENCES CITED

The following references are of record in the file of this patent:

UNITED STATES PATENTS

| Number | Name | Date |
| --- | --- | --- |
| D. 55,445 | Welch | June 8, 1920 |
| D. 57,894 | Eklund | May 17, 1921 |
| 1,358,746 | Jones | Nov. 16, 1920 |
| 1,445,219 | Larson | Feb. 13, 1923 |
| 2,103,998 | Birkhead | Dec. 28, 1937 |

FOREIGN PATENTS

| Number | Country | Date |
| --- | --- | --- |
| 482,211 | France | Dec. 5, 1916 |
| 724,055 | France | Jan. 3, 1932 |